(12) United States Patent
Dudebout et al.

(10) Patent No.: US 9,410,702 B2
(45) Date of Patent: Aug. 9, 2016

(54) GAS TURBINE ENGINE COMBUSTORS WITH EFFUSION AND IMPINGEMENT COOLING AND METHODS FOR MANUFACTURING THE SAME USING ADDITIVE MANUFACTURING TECHNIQUES

(71) Applicant: HONEYWELL INTERNATIONAL INC., Morristown, NJ (US)

(72) Inventors: Rodolphe Dudebout, Phoenix, AZ (US); Dustin Brandt, Tempe, AZ (US); David Waldman, Chandler, AZ (US); James Neumann, Phoenix, AZ (US); Art Payne, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 236 days.

(21) Appl. No.: 14/176,686

(22) Filed: Feb. 10, 2014

(65) Prior Publication Data

US 2015/0226433 A1    Aug. 13, 2015

(51) Int. Cl.
*F23R 3/16* (2006.01)
*F23R 3/00* (2006.01)
*F23R 3/06* (2006.01)

(52) U.S. Cl.
CPC . *F23R 3/16* (2013.01); *F23R 3/002* (2013.01); *F23R 3/06* (2013.01);
(Continued)

(58) Field of Classification Search
CPC .............. F23R 3/16; F23R 3/002; F23R 3/06; F23R 2900/03041; F23R 2900/03044
USPC .................................................. 60/752–760
See application file for complete search history.

(56) References Cited

U.S. PATENT DOCUMENTS 3,623,711 A    11/1971  Thorstenson 4,896,510 A *  1/1990  Foltz .................. F23R 3/002
                                                60/757
(Continued)

FOREIGN PATENT DOCUMENTS

CN        101526228 A      9/2009
EP          2246623 A1    11/2010
(Continued)

OTHER PUBLICATIONS

Cerri, G. et al.; Advances in Effusive Cooling Techniques of Gas Turbines, Available online at www.sciencedirect.com—ScienceDirect Applied Thermal Engineering 27 (2007) 692-698, 2006 published by Elsevier Ltd.
(Continued)

*Primary Examiner* — Steven Sutherland
(74) *Attorney, Agent, or Firm* — Ingrassia, Fisher & Lorenz, P.C.

(57) ABSTRACT

Disclosed in various exemplary embodiments are turbine engine combustors with effusion and impingement cooling and methods for manufacturing the same. In one exemplary embodiment, disclosed is a combustor for a turbine engine that includes an annular liner portion including a first metering hole positioned on a cold side annular surface of the annular liner portion and an impingement chamber positioned in the annular liner. The impingement chamber connects to an entry hole on the cold side annular surface and includes a cooling air outlet passageway that is angled with respect to a hot side annular surface of the annular liner portion and that connects to an exit hole positioned on the hot side annular surface of the annular liner portion. The first metering hole is connected to the impingement chamber. The cooling air outlet passageway directs the air onto the hot side annular surface and spreads the airflow axially and laterally parallel to the hot side annular surface. Furthermore, a ratio of a radial thickness of the annular liner portion to a diameter of the entry hole is from about 2 to about 6.

13 Claims, 9 Drawing Sheets

(52) U.S. Cl.
CPC ............... *F23R 2900/00018* (2013.01); *F23R 2900/03041* (2013.01); *F23R 2900/03044* (2013.01); *Y02T 50/675* (2013.01); *Y10T 29/49229* (2015.01)

(56) References Cited

U.S. PATENT DOCUMENTS

| | | | |
|---|---|---|---|
| 5,329,773 A * | 7/1994 | Myers | F23R 3/002 |
| | | | 60/757 |
| 5,758,504 A | 6/1998 | Abreu et al. | |
| 6,145,319 A * | 11/2000 | Burns | F23R 3/002 |
| | | | 60/754 |
| 6,170,266 B1 | 1/2001 | Pidcock et al. | |
| 6,307,175 B1 | 10/2001 | Blochlinger et al. | |
| 6,573,474 B1 | 6/2003 | Loringer | |
| 7,019,257 B2 | 3/2006 | Stevens | |
| 7,246,993 B2 | 7/2007 | Bolms et al. | |
| 7,328,580 B2 * | 2/2008 | Lee | B23K 26/384 |
| | | | 415/115 |
| 7,467,922 B2 | 12/2008 | Beeck et al. | |
| 7,812,282 B2 | 10/2010 | Kuhn et al. | |
| 7,886,541 B2 | 2/2011 | Woolford et al. | |
| 7,926,278 B2 | 4/2011 | Gerendas et al. | |
| 8,051,663 B2 | 11/2011 | Tuthill | |
| 8,091,367 B2 | 1/2012 | Alkabie | |
| 8,099,961 B2 | 1/2012 | Gerendas | |
| 2006/0053798 A1 * | 3/2006 | Hadder | F23R 3/007 |
| | | | 60/772 |
| 2010/0186416 A1 * | 7/2010 | Chen | F23R 3/06 |
| | | | 60/755 |
| 2010/0192588 A1 | 8/2010 | Gerendas | |
| 2010/0263384 A1 | 10/2010 | Chila | |
| 2011/0185739 A1 | 8/2011 | Bronson et al. | |
| 2012/0102959 A1 | 5/2012 | Starkweather | |

FOREIGN PATENT DOCUMENTS

| | | |
|---|---|---|
| GB | 2202907 A | 3/1987 |
| WO | 8806257 A1 | 8/1988 |
| WO | 03006883 A1 | 1/2003 |
| WO | 2012065851 A1 | 5/2012 |

OTHER PUBLICATIONS

Miao, Jr-M. et al; Numerical Approach to Hole Shape Effect on Film Cooling Effectiveness Over Flat Plate Including Internal Impingement Cooling Chamber, Available online at www.sciencedirect.com—ScienceDirect International Journal of Heat and Mass Transfer 49 (2006) 919-938, 2005 published by Elsevier Ltd.

Krewinkel, R.; A Review of Gas Turbine Effusion Cooling Studies, Available online at www.elsevier.com/locate/ijhmt—International Journal of Heat and Mass Transfer 66 (2013) 706-722, 2013 published by Elsevier Ltd.

Extended EP search report for EP 15152945.0-1605 dated Dec. 6, 2015.

* cited by examiner

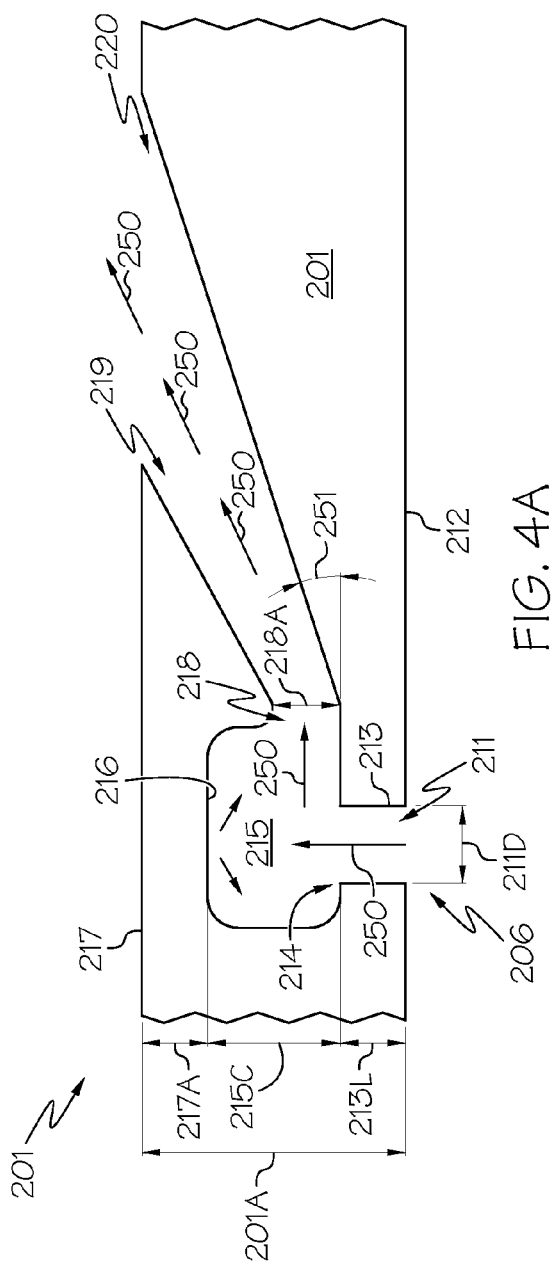
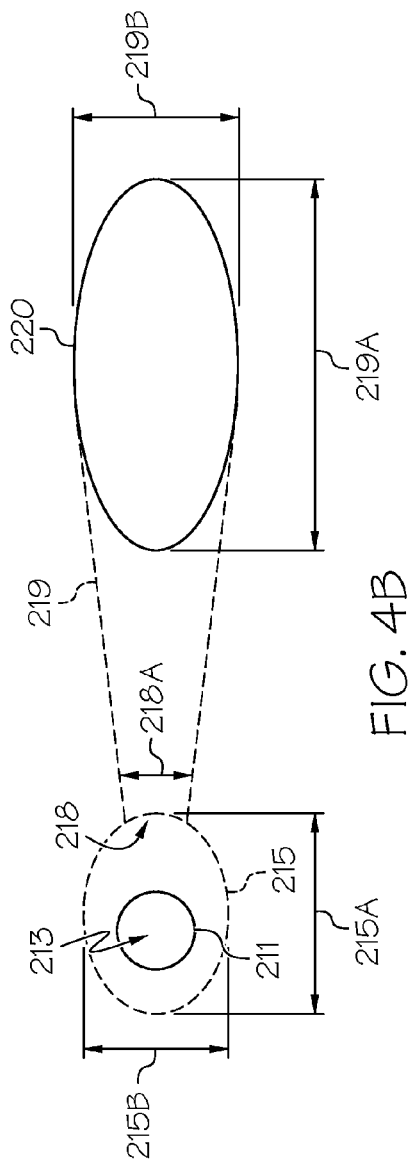
FIG. 4A
FIG. 4B

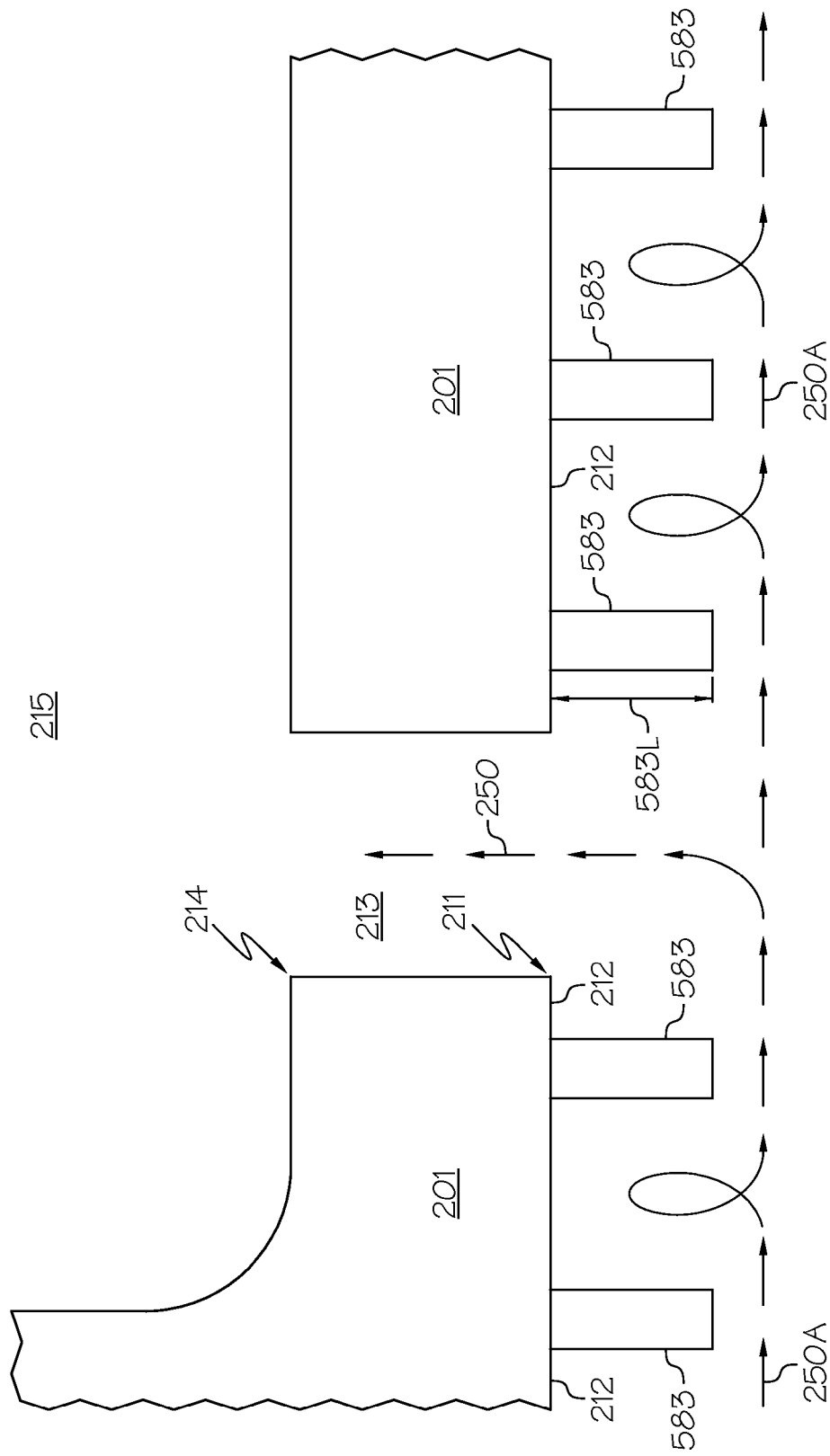

GAS TURBINE ENGINE COMBUSTORS WITH EFFUSION AND IMPINGEMENT COOLING AND METHODS FOR MANUFACTURING THE SAME USING ADDITIVE MANUFACTURING TECHNIQUES

TECHNICAL FIELD

The present invention relates to gas turbine engines, and more particularly, to gas turbine engine combustors.

BACKGROUND

A gas turbine engine may be used to power various types of vehicles and systems. A particular type of gas turbine engine that may be used to power aircraft is a turbofan gas turbine engine. A turbofan gas turbine engine conventionally includes, for example, five major sections: a fan section, a compressor section, a combustor section, a turbine section, and an exhaust section.

The fan section is typically positioned at the inlet section of the engine and includes a fan that induces air from the surrounding environment into the engine and that accelerates a portion of this air towards the compressor section. The remaining portion of air induced into the fan section is accelerated into and through a bypass plenum and out the exhaust section. The compressor section raises the pressure of the air to a relatively high level.

The compressed air from the compressor then enters the combustor section, where a plurality of fuel nozzles injects a steady stream of fuel into a combustion chamber formed by two liners joined by a dome. The combustor dome may be made of a double wall to provide protection from hot gases. The double walled dome typically has an inner surface, aligned towards the flame, that may be referred to as a heat shield. After the injected fuel is ignited in the combustor, the energy of the compressed air significantly increases. The high-energy compressed gases from the combustor section then flows into and through the turbine section, causing rotationally mounted turbine blades to rotate and expand these gases to produce mechanical energy. The gases exiting the turbine section is exhausted from the engine via the exhaust section, and the energy remaining in the exhaust gas aids the thrust generated by the air flowing through the bypass plenum.

Because combustors are subjected to high temperatures (e.g., temperatures in excess of 2000° C.), they may have limited service lives. In some cases, combustors may have high heat release rates. Thus, the liner, dome, or heat shield surfaces of the combustor may crack, oxidize, or become distorted. To improve the service life of the combustor, the temperature of the liner, dome, or heat shield may be lowered.

Multi-holed angled effusion cooling can be used to lower liner, dome, or heat shield temperatures. In this regard, a plurality of "effusion holes", which are formed through the combustor liner, direct cooling air from outside of the combustor liner to an inner surface of the combustor liner (e.g., where the combustor liner is exposed to the high temperatures). As a result, the liner is cooled as air flows through each effusion hole and enters the combustor to form an air film to thereby isolate the high temperature gases from the liner. To enhance effusion film cooling effectiveness, the area and shape of effusion holes may be varied from a smaller circular inlet to a larger, fan shaped outlet. Varying the area of the effusion holes may cause the air to diffuse so that its velocity is reduced as the air film forms.

In the alternative to or in addition to effusion cooling, impingement cooling can be used to lower liner, dome, or heat shield temperatures. Impingement cooling works by blowing onto the inner surface of the combustor with high velocity air. This allows more heat to be transferred by convection than regular convection cooling does.

Traditional approaches to impingement and effusion cooling separate the impingement holes from the film cooling (effusion) holes. This separation is desired because of the manufacturing techniques that preclude (or largely inhibit) non line-of-sight holes. The separation of the impingement and effusion cooling also inhibits heat transfer between the liner providing the impingement cooling and the liner providing the effusion cooling, leading to thermally decoupled mechanisms that require compliant or slip joints to accommodate the thermal expansion differences between the liners. By combining the film and impingement in one liner, this affords the opportunity to eliminate compliant or slip joints and optimizes heat transfer. In addition, the opportunity for combining impingement and film/effusion cooling into one liner can provide cost/weight benefits relative to these approaches.

Accordingly, it is desirable to provide for an impingement-effusion cooling configuration that exhibits improved cooling effectiveness. Additionally, it is desirable to provide such configurations at a reduced manufacturing cost and at a reduced overall weight as compared to prior art combustors. Furthermore, other desirable features and characteristics of the present invention will become apparent from the subsequent detailed description of the invention and the appended claims, taken in conjunction with the accompanying drawings and this background of the invention.

BRIEF SUMMARY

Disclosed in various exemplary embodiments are turbine engine combustors with effusion and impingement cooling and methods for manufacturing the same. In one exemplary embodiment, disclosed is a combustor for a turbine engine that includes an annular liner portion including a first metering hole positioned on a cold side annular surface of the annular liner portion and an impingement chamber positioned in the annular liner. The impingement chamber connects to an entry hole on the cold side annular surface and includes a cooling air outlet passageway that is angled with respect to a hot side annular surface of the annular liner portion and that connects to an exit hole positioned on the hot side annular surface of the annular liner portion. The first metering hole is connected to the impingement chamber. The cooling air outlet passageway directs the air onto the hot side annular surface and spreads the airflow axially and laterally parallel to the hot side annular surface. Furthermore, a ratio of a radial thickness of the annular liner portion to a diameter of the entry hole is from about 2 to about 6.

In another exemplary embodiment, a method for manufacturing a combustor for a turbine engine includes the step of generating a three-dimensional model of the combustor. The model includes an annular liner portion including a first metering hole positioned on a cold side annular surface of the annular liner portion and an impingement chamber positioned in the annular liner. The impingement chamber connects to an entry hole on the cold side annular surface and includes a cooling air outlet passageway that is angled with respect to a hot side annular surface of the annular liner portion and that connects to an exit hole positioned on the hot side annular surface of the annular liner portion. The first metering hole is connected to the impingement chamber. The cooling air outlet passageway directs the air onto the hot side annular surface and spreads the airflow axially and laterally parallel to the hot side annular surface. Furthermore, a ratio of a radial thickness of the annular liner portion to a diameter of the entry hole is from about 2 to about 6. The method further includes the step of manufacturing the combustor using an additive manufacturing technique in accordance with the generated three-dimensional model.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein:

FIGS. 4A and 4B are cross-section and plan views, respectively, of an effusion/impingement cooling configuration that may be implemented on the liner of FIG. 3;

FIG. 7A is a cross-section view of an alternative embodiment of a liner configuration including turbulators;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, the present disclosure sets forth methods and apparatus for using additive manufacturing techniques to build a gas turbine combustor liner wall with a significantly enhanced form of impingement effusion cooling, with minimal or no added cost or weight. The enhanced cooling would enable higher durability at a given cycle temperature, or equal durability at a higher cycle temperature, both of which are important for cost of ownership of an engine. The present disclosure discloses a combustor liner that admits compressor discharge air through an initial metering orifice into an intermediate cavity. The air flowing through metering orifice then impinges onto the hot side of the cavity providing cooling. The air from the cavity is then discharged through another orifice into the film cooling passage. The film cooling passage can either be a cylinder or non-cylindrical (i.e., shaped, diffusing, or directed) cooling passage. The film cooling passage can be one or more cooling passages, and there could be a connecting passage in the metal which could provide more convective cooling. Finally the film cooling passage discharges into the combustor cavity and provides film cooling on the hot side surface. The disclosed combustor liner is manufactured using an additive manufacturing process whereby the liner is successively built with about 5000 to about 50,000 of the above-described cooling holes.

Figure 1:
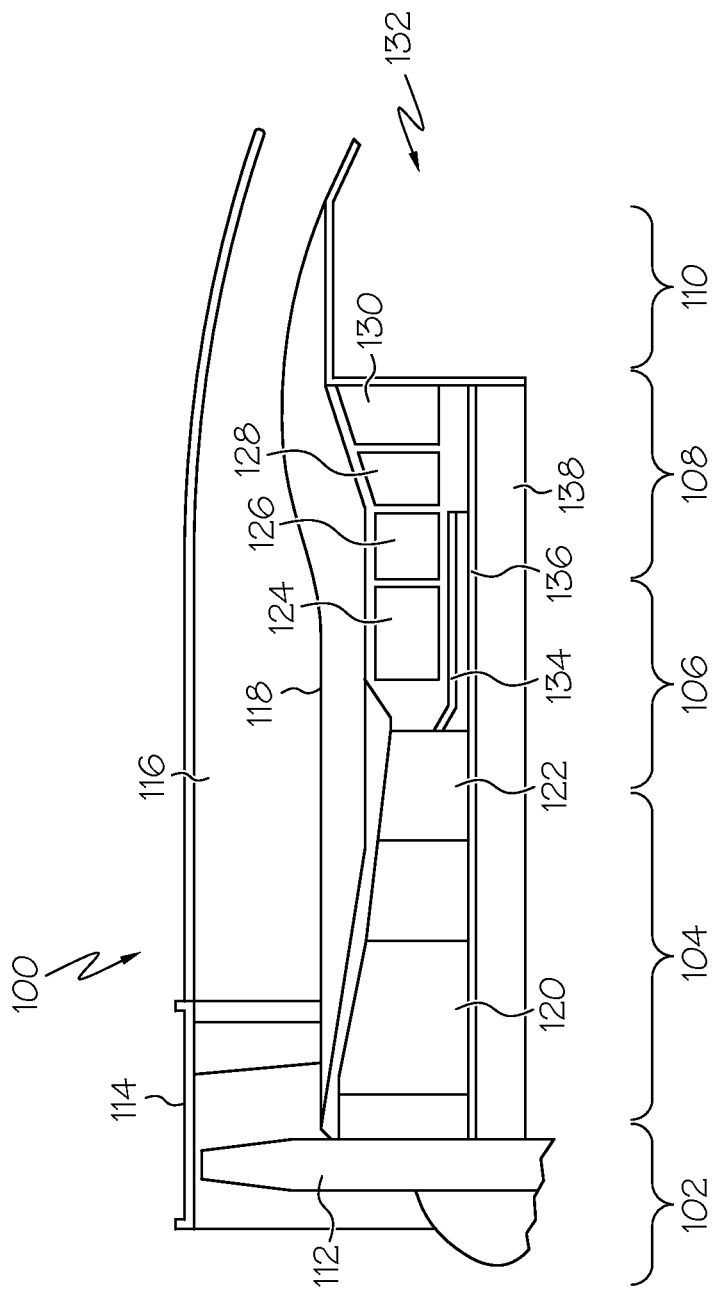
FIG. 1 is a simplified cross-sectional side view of an exemplary multi-spool turbofan gas turbine jet engine according to an exemplary embodiment.

Turning now to the Figures, an exemplary embodiment of a multi-spool turbofan gas turbine jet engine 100 is depicted in FIG. 1, and includes an intake section 102, a compressor section 104, a combustion section 106, a turbine section 108, and an exhaust section 110. In general, the view of FIG. 1 shows half of the engine 100 with the rest rotationally extended about longitudinal axis 140. In addition to the depicted engine 100, exemplary embodiments discussed below may be incorporated into any type of engine and/or combustion section.

The intake section 102 includes a fan 112, which is mounted in a fan case 114. The fan 112 draws in and accelerates air into the intake section 102. A fraction of the accelerated air exhausted from the fan 112 is directed through a bypass section 116 disposed between the fan case 114 and an engine cowl 118. The remaining fraction of air exhausted from the fan 112 is directed into the compressor section 104.

The compressor section 104 includes an intermediate pressure compressor 120 and a high pressure compressor 122. The intermediate pressure compressor 120 raises the pressure of the air from the fan 112 and directs the compressed air into the high pressure compressor 122. The high pressure compressor 122 compresses the air further and directs the high pressure air into the combustion section 106. In the combustion section 106, the high pressure air is mixed with fuel and combusted in a combustor 124. The combusted air is then directed into the turbine section 108.

The turbine section 108 may have three turbines disposed in axial flow series, including a high pressure turbine 126, an intermediate pressure turbine 128, and a low pressure turbine 130. The combusted air from the combustion section 106 expands through each turbine, causing it to rotate. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138. The air is then exhausted through a propulsion nozzle 132 disposed in the exhaust section 110.

Figure 3:
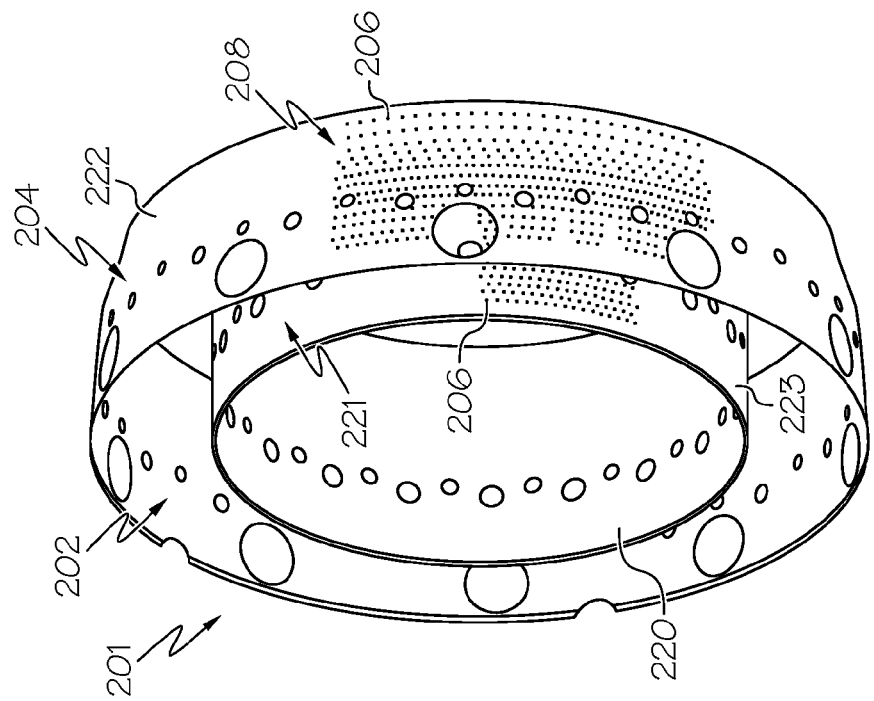
FIG. 3 is an isometric view of exemplary inner and outer liners that may be used in the combustor of FIG. 2.
Figure 2:
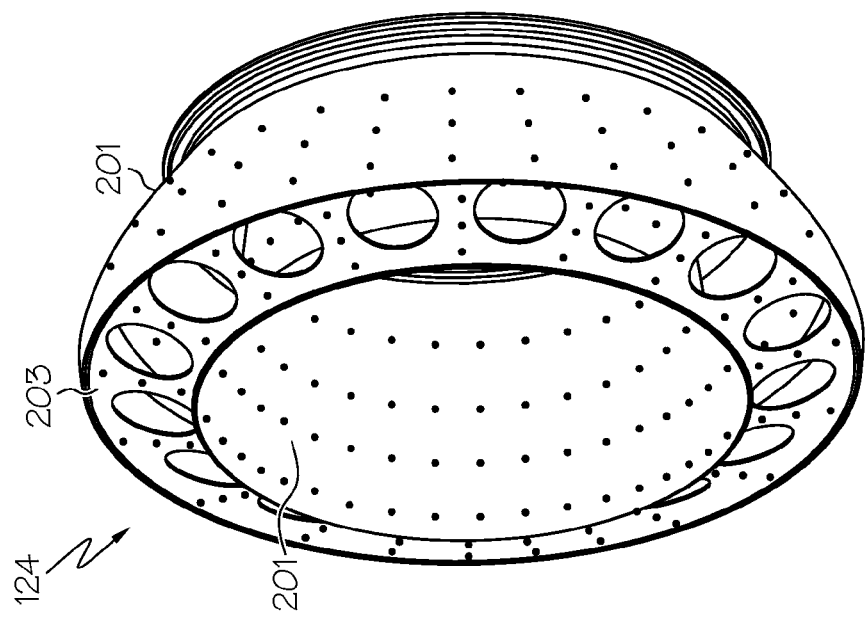
FIG. 2 is an isometric view of an exemplary combustor that may be used in the engine of FIG. 1.

Turning now to FIG. 2, a perspective view of a combustor 124 is provided, according to an embodiment. The combustor 124 is generally formed from one or more cylindrical or conical combustor liners 201 attached to a dome 203. Although shown in this embodiment as being single-walled, the combustor liner may be double-walled in other embodiments. An outer wall 222 of the combustor liner 201, as shown in FIG. 3, includes a first surface 202, a second surface 204, and a plurality of impingement/effusion holes 206. An inner wall 223 of the combustor liner 201 includes a first surface 220, a second surface 221, and a plurality of impingement/effusion holes 206. The impingement/effusion holes 206 may be disposed in a plurality of rows 208 that may be circumferentially and/or axially formed in the combustor liner 201. The impingement/effusion holes 206 may or may not be evenly spaced around the circumference or length of the combustor 124. As indicated in FIG. 2, the impingement/effusion holes 206 may also be formed in the dome 203 or the dome's heat shield.

Reference is now made to FIGS. 4A and 4B, which are cross-section and plan views, respectively, of an effusion/impingement cooling configuration that may be implemented on the liner 201 of FIG. 3 of which the inner wall 223 is shown in greater detail on FIGS. 4A and 4B. The illustrated impingement/effusion hole 206 includes a cooling air entry opening 211, which is positioned along the "cold side" 212 or outer annular surface of the liner 201. In some embodiments, the cold side 212 may have turbulators 583 to improve convection of the cooling air, as further described and illustrated in connection with FIG. 7. The opening 211 may, in some embodiments, be configured in a generally circular configuration. In other embodiments, the opening 211 may have another shape, such as oval, ellipse, square, rectangular, etc. The diameter of opening 211, in the illustrated circular configuration, is shown by arrow 211D. The diameter 211D may be sized from about 10 mils to about 30 mils, for example, from about 15 mils to about 25 mils. The diameter 211D represents the narrowest dimension of the opening 211 for non-circular configurations.

The flow of cooling air 250, which may represent compressed air from the compressor section 104 that by-passes the combustor 124 inlet, is indicated generally by arrows. Cooling air 250 passes axially along the liner 201 (particularly the cold side 212 thereof), and enters radially into opening 211. The cooling air 250 moves radially through entry passage 213, which begins at the opening 211, and ends the entrance 214 to the impingement chamber 215. The entry passage 213 may generally have the same cross-section as the opening 211. For example, the entry passage 213 may have a generally circular cross-section defined by diameter 211D. Of course, as noted above, other shapes are possible. The entry passage 213, when having a circular cross-section, may be generally cylindrical in shape. The length of the cylindrical shape, further defined by length 213L (extending radially), may be from about 10 mils to about 30 mils, for example, from about 15 mils to about 25 mils.

The flow of cooling air 250 continues from the passage 213, through the entrance 214 into the impingement chamber 215. In the chamber 215, the cooling air impinges against the inner wall 216 of chamber 215, which is near the "hot side" 217 or inner annular surface of the liner 201. In some embodiments, as shown and described in greater detail in connection with FIG. 8, multiple chambers with multiple inlet passages, fluidly connected together, may be provided. The distance between inner wall 216 and hot side 217 (shown as radial thickness 217A) may be from about 10 mils to about 30 mils, for example, from about 15 mils to about 25 mils. Upon impinging the inner wall 216, the cooling air 250 disperses within the chamber 215. In general, the chamber 215 may have an oval cross-section, as shown in FIG. 4B. However, in other embodiments, other shapes such as rectangular, square, circular, etc., are possible. Where the shape is an oval, the cross-section may have a major axis 215A from about 20 mils to about 70 mils, for example from about 30 mils to about 50 mils. The cross-section may have a minor axis 215B from about 15 mils to about 60 mils, for example from about 30 mils to about 45 mils. The chamber 215 may further have a radial depth 215C from about 15 mils to about 60 mils, for example from about 30 mils to about 45 mils. The entrance 214 to chamber 215 may be positioned anywhere along the major axis 215A with respect to chamber 215, although it is shown in FIG. 4A at its mid-position therealong. As such, the liner 201 may have an overall radial thickness 201A of about 25 mils to about 100 mils, for example from about 50 mils to about 70 mils. Accordingly, a ratio of a radial thickness of the liner 201 to a diameter of the entry opening 211 is from about 2 to about 6.

The chamber 215 further includes a cooling air exit 218 that allows cooling air 250 to exit the chamber 215 after providing cooling therein. The exit 218 may be positioned anywhere along the radial depth 215C with respect to chamber 215, although in FIG. 4A it is shown positioned at a radial end therealong. The exit 218 may have a generally circular or a generally oval cross-section, defined by major axis 218A and minor axis 218B. Axes 218A and 218B are the same in a circular configuration, but different in an oval configuration. For example, major axis 218A may be from about 10 mils to about 30 mils, for example, from about 15 mils to about 25 mils, and likewise, minor axis 218B may be from about 10 mils to about 30 mils, for example, from about 15 mils to about 25 mils.

Cooling air 250 flows axially through exit 218 into an exit passage 219. Exit passage 219 may generally have an oval cross-section, although circular, square, rectangular, and other cross-sections are possible. Exit passage 219 generally extends axially with respect to the liner 201, but is also inclined radially to allow the passage to extend from the chamber 215 to the hot side 217, wherein the cooling air 250 joins with the combusted air travelling axially downstream within the combustor 124. In the oval configuration, the cross-section has a major axis 219A that may be from about 50 mils to about 150 mils. Further, in the oval configuration, the cross-section has a minor axis 219B that may be from about 30 mils to about 15 mils, to about 60 mils, for example from about 30 mils to about 45 mils. The angle of incline 251 may be from about 10 degrees to about 60 degrees, for example from about 15 degrees to about 40 degrees. In some embodiments, there may be multiple angles of incline, as will be described in greater detail below with regard to FIG. 5. Cooling air leaves exit passage 219 through exit opening 220 along the surface of the hot side 217. The cooling air exit passage 219 directs the cooling air onto the hot side annular surface and spreads the cooling airflow axially and laterally parallel to the hot side annular surface. As shown, the exit opening 220 has the same cross-section as the passage 219, which as noted above may be circular. In other embodiments, for example as set forth in greater detail below with regard to FIG. 6, the passage 219 and exit opening 220 may have a multi-lobed configuration.

The combustor 124 operates with a pressure drop from the outer annular surface (cold side) 212 to the inner annular surface (hot side) 217, thus causing cooling air to flow from the cold side 212 to the hot side 217, through the passageways 213, 219, and the chamber 215. While absolute pressure may vary from embodiment to embodiment, and within the same embodiment during different operating conditions of the gas turbine engine, generally speaking, the pressure drop from the cold side 212 to the chamber 215 is generally about 30% to about 70%, for example about 40% to about 60%, of the pressure drop from the chamber 215 to the hot side 217.

In some embodiments, the liner 201 may be made up of a substrate having one or more layers thereon. For example, one layer may be a thermal barrier coating made of conventional inner layer compositions such as yttria-stabilized zirconia, while the other layer may be an intermediate layer used to bond the inner layer to the substrate. The intermediate layer may be graded or may be an adhesive, in some embodiments.

The materials used to manufacture the substrate will be described in greater detail below in connection with FIGS. 9 and 10.

Figure 5:
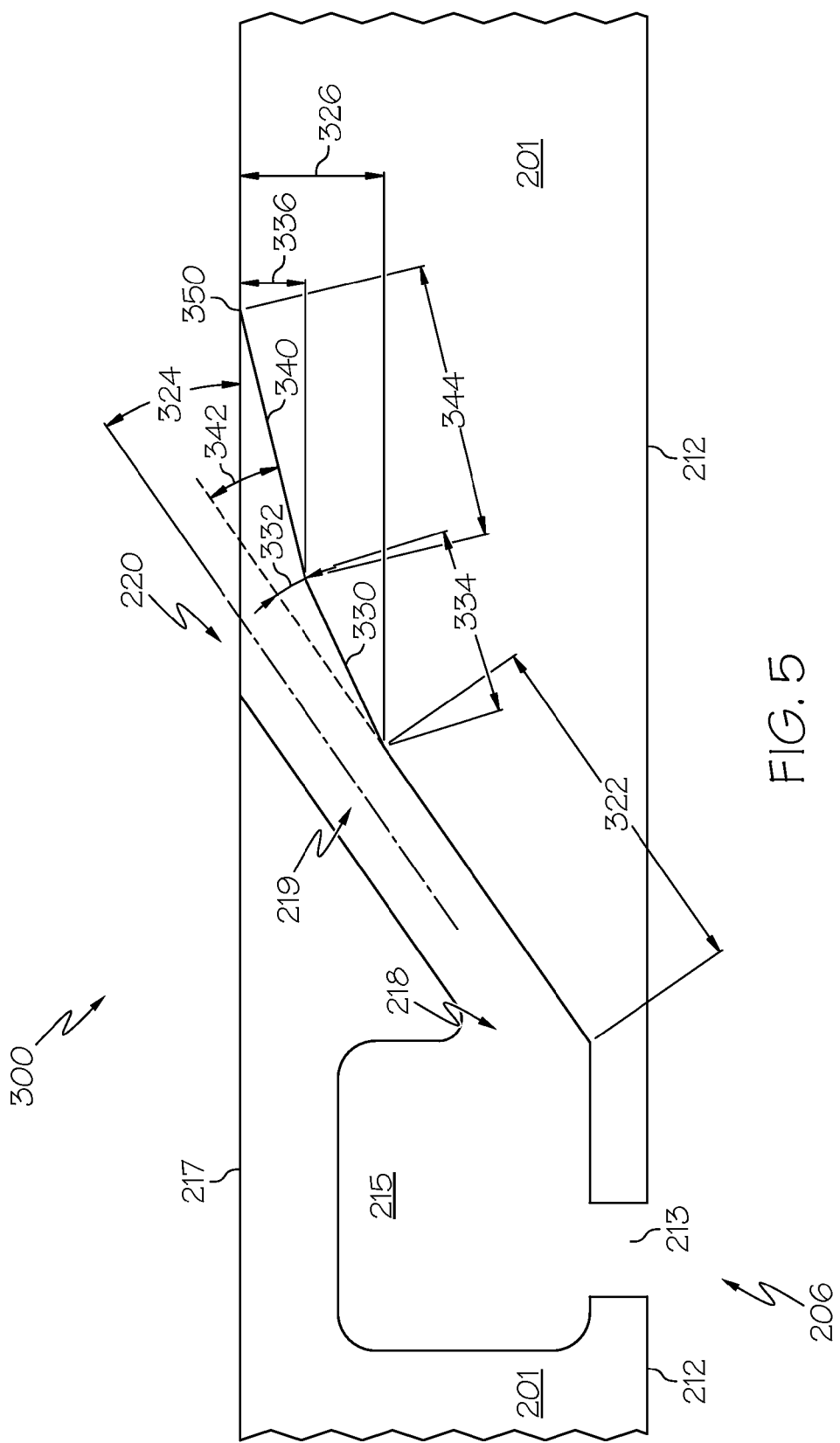
FIG. 5 is a cross-section view of an alternative embodiment of a cooling hole as compared to FIG. 4A.

As initially noted above, in some alternative embodiments, for example as shown in FIG. 5, the exit passage may have multiple angles of radial incline. For example, from the exit 218, the passage 219 may generally include a relatively straight metering portion 322, a first exit portion 330, and a second exit portion 340. The metering portion 322 extends from the exit 218 and may have a size, shape, and length configured to meter the appropriate amount of cooling air through the passage 219. The metering portion 322 may be inclined relative to the hot side 217 at any suitable angle 324 and extend to any suitable depth, e.g., from the chamber 215 to a depth 326 from the hot side 217. In one exemplary embodiment, the metering portion 322 may be inclined relative to the inner surface hot side 217 at an angle of 20°-35°, as examples.

The first exit portion 330 extends from the metering portion 322. The first exit portion 330 may have any suitable shape, including the shapes described in greater detail below. The first exit portion 330 extends at an angle 332 relative to the metering portion 322 at a length 334, e.g. from the depth 326 of the metering portion 322 to depth 336 relative to the hot side 217. The second exit portion 340 extends from the first exit portion 330. The second exit portion 340 may have any suitable shape, including the shapes described in greater detail below. The second exit portion 340 extends at an angle 342 relative to the metering portion 322 at a length 344, e.g., from the depth 336 to the hot side 217. Like the first and second exit portions 330, 340, the outlet 350 may have any suitable shape, including the shapes described in greater detail below. As shown in FIG. 5, the angle 342 of the second exit portion 340 is greater that the angle 332 of the first exit portion 330 such that the passage 219 may be considered to have a forward sweep configuration. Although the passage 219 has two, generally increasing angled portions (e.g., angles 332 and 342), other exemplary embodiments may have additional exit portions with further increasing angles.

Figure 6:
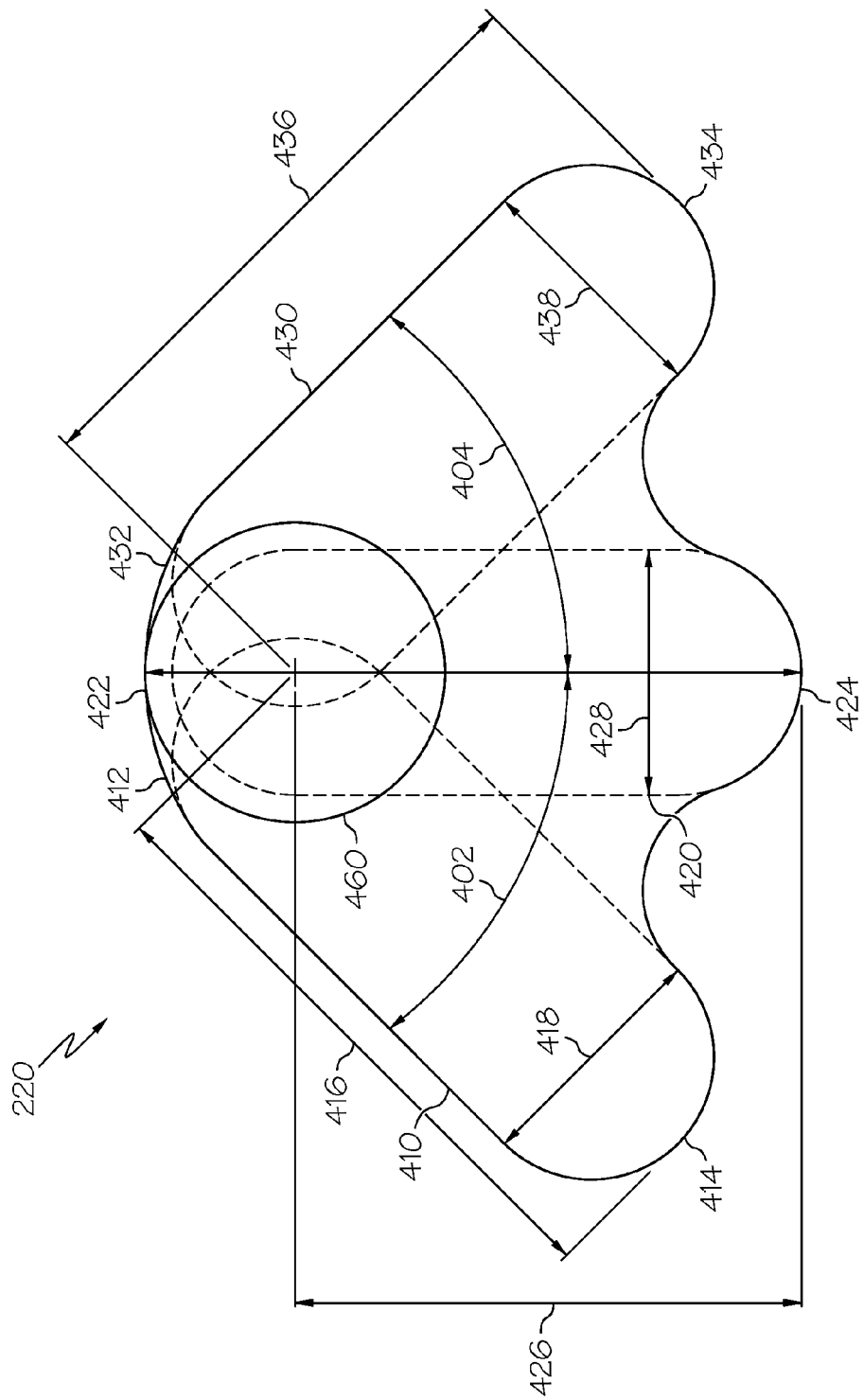
FIG. 6 is a plan view of an alternative embodiment of a cooling hole as compared to FIG. 4B.

As initially noted above, in some alternative embodiments, to reduce metal fatigue in the leading edge impingement cavity, the exit opening 220 may be provided in a multi-lobed configuration, as shown in FIG. 6. In one exemplary embodiment, the exit opening 220 is tri-lobed, e.g., the exit opening 220 is generally formed by a first lobe 410, a second lobe 420, and a third lobe 430 extending from a circular, oval or otherwise cylindrical portion 460. The cylindrical portion 460 generally corresponds to the shape of the upstream portion discussed above, and as discussed in greater detail below. The center of the cylindrical portion 460 generally corresponds to the longitudinal axis of the exit opening 220.

As shown, each lobe 410, 420, 430 may be oval shaped. In some embodiments, such an oval shape may be considered an ellipsis or a curved rectangle. Each of the lobes 410, 420, 430 has a first end 412, 422, 432 and a second end 414, 424, 434. The first ends 412, 422, 432 are generally coincident, e.g., the foci of each of the first ends 412, 422, 432 are generally aligned, or at least partially overlap with respect to one another. The first and second ends 412, 422, 432; 414, 424, 434 may be any suitable shape, including semi-circular. Moreover, the first and second ends 412, 422, 432; 414, 424, 434 may have the same or different shapes. In one exemplary embodiment, the first and second ends 412, 422, 432; 414, 424, 434 are semi-circular with a radius of curvature of about 0.0065 inches.

The second ends 414, 424, 434 may be considered splayed such that the lobes 410, 420, 430 are angled relative to one another. As such, the tri-lobed shape of the exit opening 220 may also be considered "W-shaped," "three-prong shaped," or "tri-wing shaped." Generally, the opening 220 may be referred to as "multi-lobed" with three or more lobes. Considering that the upstream portion of the exit opening 220 is cylindrical and the downstream portion, as shown in FIG. 6 is multi-lobed, the cooling hole 220 may be considered to have a cylindrical to multi-lobe (CTML) configuration.

As noted above, the lobes 410, 420, 430 may generally be oval. In one exemplary embodiment, the lobes 410, 420, 430 may have straight sides and be considered curved rectangles. In other exemplary embodiments, the lobes 410, 420, 430 may have curved sides. The lobes 410, 420, 430 may have any suitable dimensional, including any suitable length 416, 426, 436 along the respective major axis and any suitable width 418, 428, 438 along the respective minor axis. In one exemplary embodiment, the length 416, 416, 436 (measured from the hole axis) of each lobe 410, 420, 430 may be, for example, about 0.035 inches and the width 418, 428, 438 of each lobe may be, for example, about 0.013 inches, although other dimensions may be provided based on engine size, engine characteristics, and cooling requirements. In one exemplary embodiment, the length 416, 426, 436 of the lobes 410, 420, 430 increase as the passage 219 approaches the opening 220 to result in the shape shown in FIG. 6.

Additionally, the lobes 410, 420, 430 may be oriented in any suitable manner relative to one another. In the view of FIG. 6, the first lobe 410 is oriented on one side of the second lobe 420 at a first angle 402, and the third lobe 430 is oriented on the other side of the second lobe 420 at a second angle 404. In one exemplary embodiment, the angles 402, 404 are equal, although in other embodiments, the angles 402, 404 may be different. The angles 402, 404 may be, for example, between about 15° and about 75°, although larger or smaller angles 402, 404 may be provided. In the depicted embodiment, the angles 402, 404 are about 45°, as measured from an outer side to a centerline of the second lobe 420.

Figure 7B:
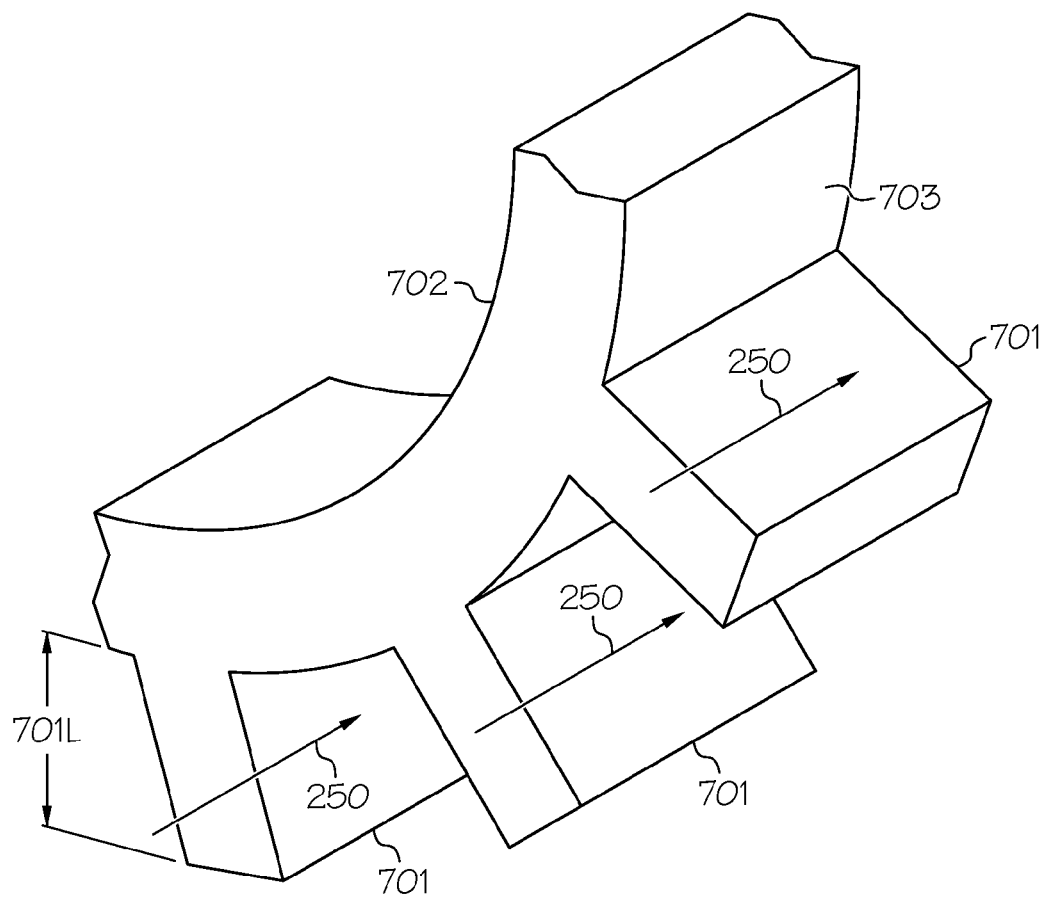
FIG. 7B is an isometric view of an alternative embodiment of a liner configuration including fins.

As initially noted above, in some alternative embodiments, for example as shown in FIGS. 7A and 7B, the cold side 212 of the liner 201 may be provided with turbulators 583 or fins 701. The turbulators are provided to increase the angular momentum or swirl of the cooling air (such movement shown by arrows 250A). Any number, shape, size, and configuration of turbulators 583 may be provided. In an exemplary embodiment, the turbulators are generally rectangular in configuration, and extend radially outward from the cold side 212 for a length 583L of about 10 mils to about 30 mils, for example, from about 15 mils to about 25 mils.

In an alternate embodiment, fins 701 extend away from the hot side 702 with the flow 250 traveling between the fins 701 allowing additional cooling of the combustor liners hot side 702 by increasing the additional heat transfer surface area. Any number, shape, size, and configuration of fins 701 may be provided. In an exemplary embodiment, the fins are generally rectangular in configuration and extend radially outward from the cold side 703 for a length of 701 L of about 10 mils to about 30 mils, for example, from about 15 mils to about 25 mils.

Figure 8:
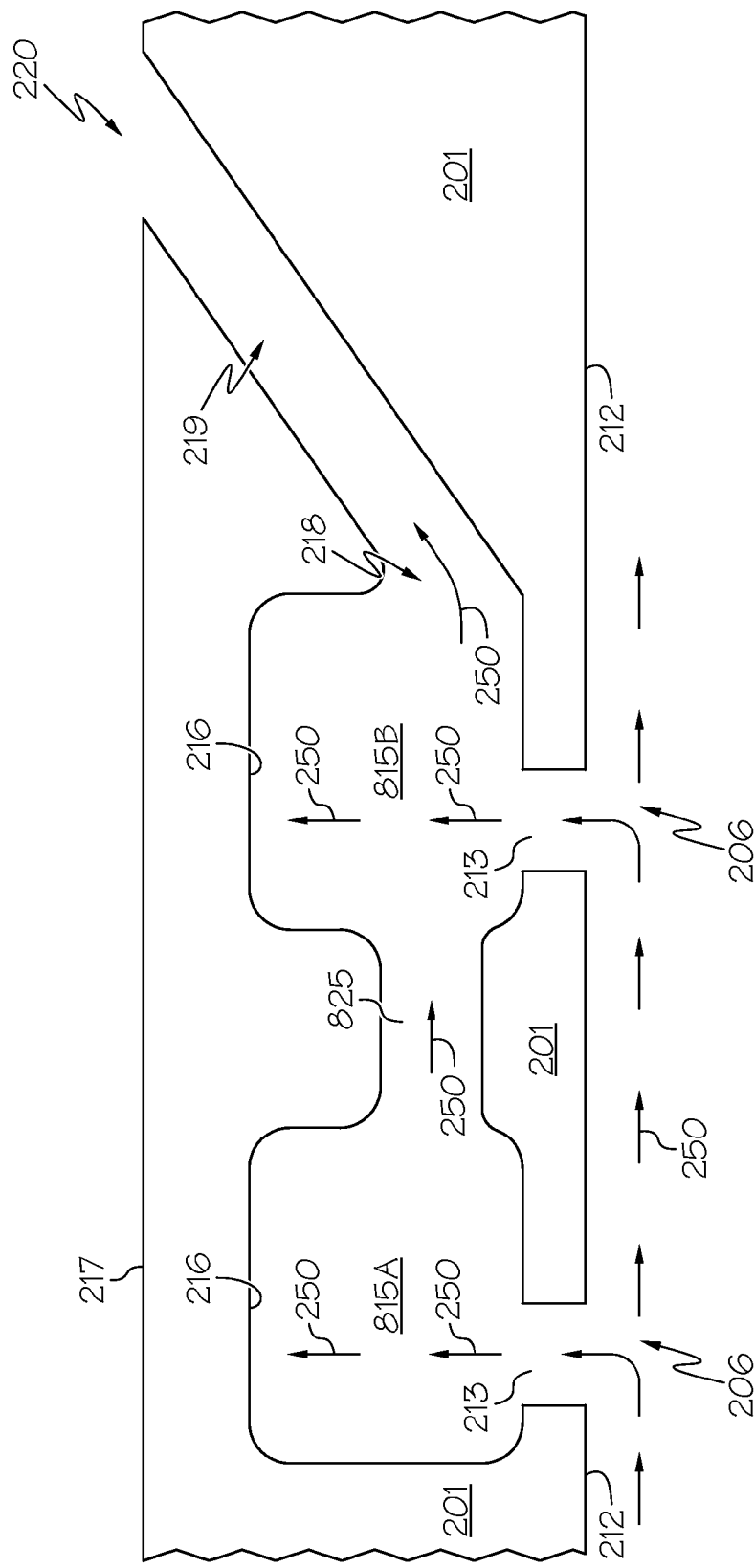
FIG. 8 is a cross-section view of an alternative embodiment of a liner including a cooling hole with multiple chambers.

Furthermore, as initially noted above, in some embodiments, as shown in greater detail with regard to FIG. 8, more than one chamber may be fluidly connected to one another. For example, first and second chambers 815A, 815B may be substantially configured as described above (each including a cooling air entry passage 213), except the chamber 815A need not have a cooling air exit 218. Rather, chamber 215A may be connected by way of a passage 825 to the second chamber 215B, which has an exit 218 to allow the cooling air 250 that enters both the first and second chambers 815A, 815B to exit therefrom to the interior of the combustor 124. Of course, while two chambers are shown fluidly connected to one another, in other embodiments, three, four, or more chambers may be connected to one another.

In general, it is expected that, based on the teachings herein, a person having ordinary skill in the art will be able to modify the liner assemblies 201 as above to conform for use in a wide variety of applications, as the selection of size, shape, etc. of working components is generally considered to be within the level of skill of a person having ordinary skill in the art. As such, the various possible implementations of the liner assemblies 201 should not be considered limited to any of the embodiments presented herein.

Greater detail regarding the additive manufacturing techniques noted above will now be provided, again with reference to the exemplary liner 201 illustrated in FIGS. 4A and 4B, for example. It will be appreciated that certain features of the presently described liner assemblies would be prohibitively expensive to manufacture using conventional manufacturing techniques. These include the chamber 215 structure, the passages 213, 219, and the optimally configured internal cooling circuits, among others. As such, designs in accordance with the present disclosure are not known in the prior art. However, it has been discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base superalloys, low density titanium, and aluminum alloys. DMLS is discussed in greater detail below. Another technique includes electron beam melting (EBM) with titanium, titanium aluminide, and nickel base super-alloy materials. Still further, casting or metal injection molding (MIM) may be employed.

Figure 9:
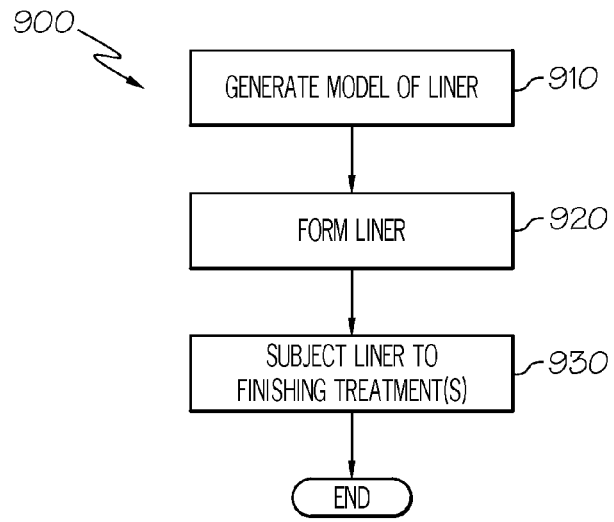
FIG. 9 is a flow diagram illustrating steps in a method of manufacturing a gas turbine engine combustor system in accordance with embodiments of the present disclosure.

FIG. 9 is a flowchart illustrating a method 900 for manufacturing a liner configuration in accordance with an exemplary embodiment using, in whole or in part, additive manufacturing techniques. In the discussion that follows, "the liner configuration" will be referred to generically as representative of any or all portions of a liner in accordance with the present disclosure, including but not limited to the configurations shown in FIGS. 4A and 4B, for example, that can be made using additive manufacturing techniques.

In a first step 910, a model, such as a design model, of the liner configuration, or component thereof, may be defined in any suitable manner. For example, the model may be designed with computer aided design (CAD) software and may include three-dimensional ("3D") numeric coordinates of the entire configuration of the liner configuration including both external and internal surfaces. In one exemplary embodiment, the model may include a number of successive two-dimensional ("2D") cross-sectional slices that together form the 3D component.

This design phase step 910 is performed in the following manner. During the design phase, the flow, thermal, and stress disciplines free the aerodynamicists to explore all liner design space options for enhanced performance, including liner shapes that preclude insertable impingement tubes for cooling the liner. The flow and thermal disciplines then optimize the aspect ratio of the impingement and internal cooling chambers to satisfy the required thermal distribution in the liner and endwalls for the allocated flow.

In step 920 of the method 900, the liner configuration, or component thereof, is formed according to the model of step 910. In one exemplary embodiment, a portion of the liner configuration is formed using a rapid prototyping or additive layer manufacturing process. In other embodiments, the entire liner configuration is formed using a rapid prototyping or additive layer manufacturing process. Although additive layer manufacturing processes are described in greater detail below, in still other alternative embodiments, portions of the liner configuration may be forged or cast in step 920, for example, with a single-crystal structure.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, DMLF is used to produce the liner configuration in step 920. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted above, and is a particularly preferred embodiment of this disclosure.

As such, in one exemplary embodiment, step 920 is performed with DMLF techniques to form the liner configuration. However, prior to a discussion of the subsequent method steps, reference is made to FIG. 10, which is a schematic view of a DMLF system 1000 for manufacturing the liner configuration, for example one or more components of the liner configuration as shown in FIGS. 4A and 4B, in accordance with an exemplary embodiment.

Figure 10:
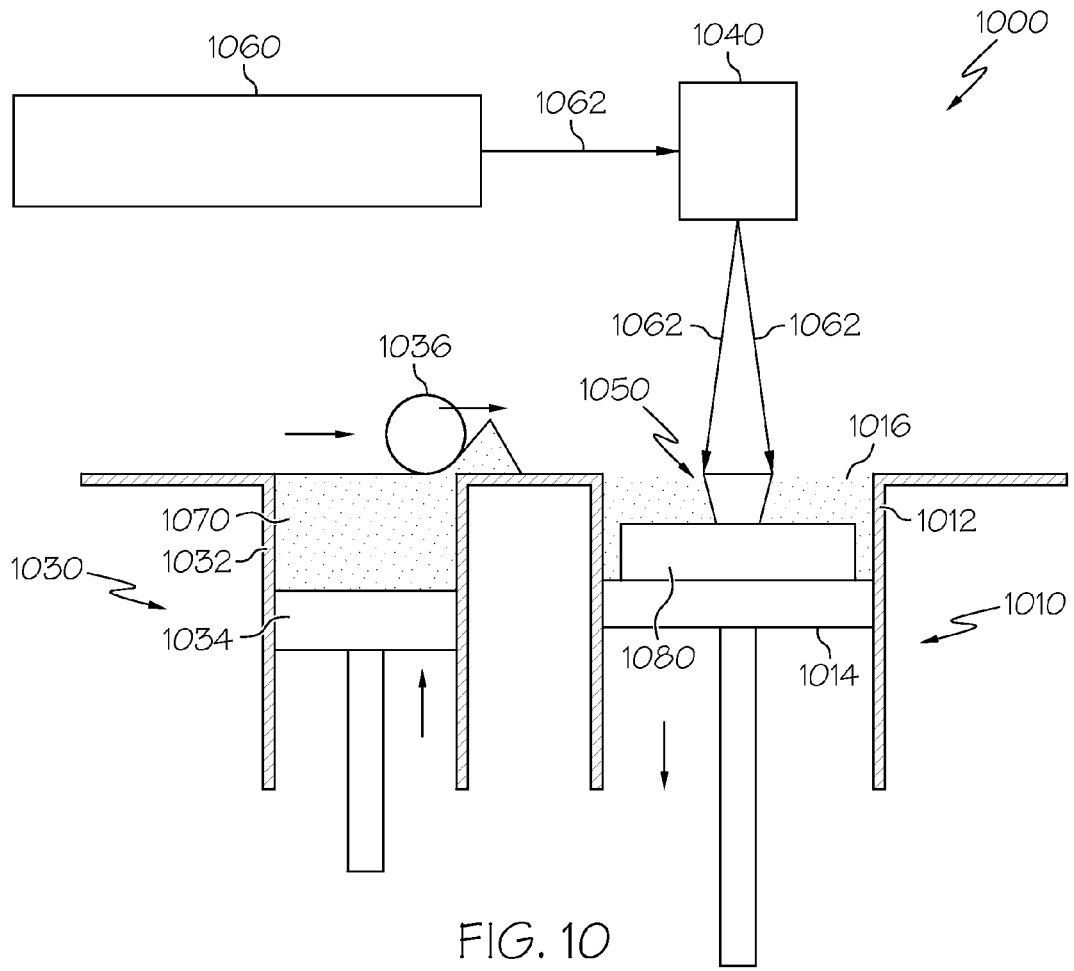
FIG. 10 is an exemplary additive manufacturing system suitable for use in manufacturing gas turbine engine combustor systems in accordance with the present disclosure.

Referring to FIG. 10, the system DMLF 1000 includes a fabrication device 1010, a powder delivery device 1030, a scanner 1040, and a laser 1060 that function to manufacture the article 1050 (e.g., the liner configuration, or a component thereof) with build material 1070. The fabrication device 1010 includes a build container 1012 with a fabrication support 1014 on which the article 1050 is formed and supported. The fabrication support 1014 is movable within the build container 1012 in a vertical direction and is adjusted in such a way to define a working plane 1016. The delivery device 1030 includes a powder chamber 1032 with a delivery support 1034 that supports the build material 1070 and is also movable in the vertical direction. The delivery device 1030 further includes a roller or wiper 1036 that transfers build material 1070 from the delivery device 1030 to the fabrication device 1010.

During operation, a base block 1080 may be installed on the fabrication support 1014. The fabrication support 1014 is lowered and the delivery support 1034 is raised. The roller or wiper 1036 scrapes or otherwise pushes a portion of the build material 1070 from the delivery device 1030 to form the working plane 1016 in the fabrication device 1010. The laser 1060 emits a laser beam 1062, which is directed by the scanner 1040 onto the build material 1070 in the working plane 1016 to selectively fuse the build material 1070 into a cross-sectional layer of the article 1050 according to the design. More specifically, the speed, position, and other operating parameters of the laser beam 1062 are controlled to selectively fuse the powder of the build material 1070 into larger structures by rapidly melting the powder particles that may melt or diffuse into the solid structure below, and subsequently, cool and re-solidify. As such, based on the control of the laser beam 1062, each layer of build material 1070 may include unfused and fused build material 1070 that respectively corresponds to the cross-sectional passages and walls that form the article 1050. In general, the laser beam 1062 is relatively low power to selectively fuse the individual layer of build material 1070. As an example, the laser beam 1062 may have a power of approximately 50 to 500 Watts, although any suitable power may be provided.

Upon completion of a respective layer, the fabrication support 1014 is lowered and the delivery support 1034 is raised. Typically, the fabrication support 1014, and thus the article 1050, does not move in a horizontal plane during this step. The roller or wiper 1036 again pushes a portion of the build material 1070 from the delivery device 1030 to form an additional layer of build material 1070 on the working plane 1016 of the fabrication device 1010. The laser beam 1062 is movably supported relative to the article 1050 and is again controlled to selectively form another cross-sectional layer. As such, the article 1050 is positioned in a bed of build material 1070 as the successive layers are formed such that the unfused and fused material supports subsequent layers. This process is continued according to the modeled design as successive cross-sectional layers are formed into the completed desired portion, e.g., the liner configuration, or component thereof, of step 920.

The delivery of build material 1070 and movement of the article 1050 in the vertical direction are relatively constant and only the movement of the laser beam 1062 is selectively controlled to provide a simpler and more precise implementation. The localized fusing of the build material 1070 enables more precise placement of fused material to reduce or eliminate the occurrence of over-deposition of material and excessive energy or heat, which may otherwise result in cracking or distortion. The unused and unfused build material 1070 may be reused, thereby further reducing scrap.

Any suitable laser and laser parameters may be used, including considerations with respect to power, laser beam spot size, and scanning velocity. As a general matter, the build material 1070 may be formed by any suitable powder, including powdered metals, such as a stainless steel powder, and alloys and super alloy materials, such as nickel-based or cobalt superalloys. In one exemplary embodiment, the build material 1070 is a high temperature nickel base super alloy such as IN718. In other embodiments, MAR-M-247, IN738, titanium, aluminum, titanium-aluminide, or other suitable alloys may be employed. In general, the powder build material 1070 may be selected for enhanced strength, durability, and useful life, particularly at high temperatures, although as described below, the powder build material 1070 may also be selected based on the intended function of the area being formed.

Returning to FIG. 9, at the completion of step 920, the article, i.e., the liner configuration, is removed from the additive manufacturing system (e.g., from the DMLF system 1000). In optional step 930, the liner configuration formed in step 920 may undergo finishing treatments. Finishing treatments may include, for example, aging, annealing, quenching, peening, polishing, hot isostatic pressing (HIP), or coatings. If necessary, the liner configuration may be machined to final specifications. As noted above, one example of a post-laser fusion process of step 930 is a HIP process in which an encapsulation layer is applied and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS." The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity. Further, as initially noted above, the combustor liner may have added thereto, on interior (hot side) walls thereof, a bond layer(s) and a thermal barrier coating layer(s).

The method 900 has been discussed above with reference to the formation of a single liner configuration, or component thereof. However, in one exemplary embodiment of the method 900, more than one liner configuration (or component thereof) may be manufactured simultaneously. Unless otherwise noted, method 900 in this embodiment proceeds as discussed above. In this embodiment of the method 900, the articles are formed on a common base block (e.g., base block 1080) to provide a common orientation and a known point of reference and formed as discussed above. Successive layers can be formed for the group of articles simultaneously according to a common module or design. For example, the powdered metal may be deposited across a single working plane and one or more lasers may selectively fuse the layers of each intermediate turbine article, either sequentially or simultaneously. The articles may then be lowered together for the formation of the next layer. Simultaneous fabrication of a number of components may reduce cost and variability of the manufacturing process.

Accordingly, exemplary embodiments may enhance combustor liner configurations fabricated with additive manufacturing techniques, including DMLF/DMLS. In particular, the utility, design, durability, manufacturing cost, and life span of the liner configuration may be improved by providing both impingement and effusion cooling in the manner noted above.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A combustor for a turbine engine, comprising:
   an annular liner portion comprising a first impingement hole positioned on a cold side annular surface of the annular liner portion; and
   an impingement chamber positioned in the annular liner portion, the impingement chamber comprising a chamber entry opening and a chamber exit opening, the impingement chamber connecting to a cooling air entry opening on the cold side annular surface via the first impingement hole and connecting to a cooling air outlet passageway that is angled with respect to a hot side annular surface of the annular liner portion and that connects to a cooling air exit opening positioned on the hot side annular surface of the annular liner portion, wherein the first impingement hole is connected to the impingement chamber at the chamber entry opening, wherein the cooling air outlet passageway is connected to the impingement chamber at the chamber exit opening, wherein the impingement chamber comprises an impingement surface disposed at a radially hot side end of the impingement chamber, and wherein the chamber exit opening is positioned radially outwardly toward to the cold side annular surface with respect to the impingement surface such that the chamber exit opening is disposed adjacent to a radially cold side end of the impingement chamber and is further oriented along the impingement chamber to allow cooling air to exit the impingement chamber in an axial direction, wherein the cooling air outlet passageway is configured to allow the cooling air onto the hot side annular surface, and wherein a ratio of a radial thickness of the annular liner portion to a diameter of the cooling air entry opening is from 2 to 6.

2. The combustor of claim 1, wherein the impingement surface is separated from the hot side annular surface by a distance of 10 mils to 30 mils.

3. The combustor of claim 1, wherein the first impingement hole extends for a distance of 10 mils to 30 mils from the cold side annular surface.

4. The combustor of claim 3, wherein the first impingement hole has a cylindrical configuration with a diameter of 10 mils to 30 mils.

5. The combustor of claim 1, wherein the chamber exit opening has a smallest cross-sectional dimension of 10 mils to 30 mils.

6. The combustor of claim 1, further comprising turbulators or fins on the cold side annular surface.

7. The combustor of claim 1, wherein the cooling air outlet passageway is angled at two or more angles radially with respect to the hot side annular surface.

8. The combustor of claim 1, further comprising a second impingement chamber in fluid connection with said impingement chamber, and a cooling air inlet passageway connecting with the second impingement chamber, wherein the second impingement chamber does not have a second cooling air outlet passageway directly connected thereto.

9. The combustor of claim 1, wherein the cooling air exit opening comprises a multi-lobed configuration or a diffusing shape.

10. A method for manufacturing a combustor for a turbine engine comprising the steps of:

generating a three-dimensional model of the combustor, the model comprising:

an annular liner portion comprising a first impingement hole positioned on a cold side annular surface of the annular liner portion; and an impingement chamber positioned in the annular liner portion, the impingement chamber comprising a chamber entry opening and a chamber exit opening, the impingement chamber connecting to a cooling air entry opening on the cold side annular surface via the first impingement hole and connecting to a cooling air outlet passageway that is angled with respect to a hot side annular surface of the annular liner portion and that connects to a cooling air exit opening positioned on the hot side annular surface of the annular liner portion, wherein the first impingement hole is connected to the impingement chamber at the chamber entry opening, wherein the cooling air outlet passageway is connected to the impingement chamber at the chamber exit opening, wherein the impingement chamber comprises an impingement surface disposed at a radially hot side end of the impingement chamber, and wherein the chamber exit opening is positioned radially outwardly toward to the cold side annular surface with respect to the impingement surface such that the chamber exit opening is disposed adjacent to a radially cold side end of the impingement chamber, wherein the cooling air outlet passageway directs cooling air onto the hot side annular surface, and wherein a ratio of a radial thickness of the annular liner portion to a diameter of the cooling air entry opening is from 2 to 6; and manufacturing the combustor using direct metal laser fusion or electron beam melting in accordance with the generated three-dimensional model.

11. The method of claim 10, wherein manufacturing comprises manufacturing using direct metal laser fusion (DMLF).

12. The method of claim 10, wherein manufacturing comprises manufacturing using electron beam melting (EBM).

13. The method of claim 10, further comprising subjecting the manufactured combustor to a finishing treatment.

* * * * *